(12) United States Patent
Fails et al.

(10) Patent No.: US 8,668,231 B1
(45) Date of Patent: Mar. 11, 2014

(54) PIPE REPAIR COUPLING

(71) Applicants: Sidney T. Fails, Bassfield, MS (US);
Vickie L. Fails, Bassfield, MS (US)

(72) Inventors: Sidney T. Fails, Bassfield, MS (US);
Vickie L. Fails, Bassfield, MS (US)

( * ) Notice: Subject to any disclaimer, the term of this patent is extended or adjusted under 35 U.S.C. 154(b) by 0 days.

(21) Appl. No.: 13/752,354

(22) Filed: Jan. 28, 2013

(51) Int. Cl.
*F16L 21/06* (2006.01)

(52) U.S. Cl.
USPC ............................. 285/322; 285/15; 285/369

(58) Field of Classification Search
USPC ............................. 285/15, 369, 373, 322, 323
See application file for complete search history.

(56) References Cited

U.S. PATENT DOCUMENTS

| | | | | |
|---|---|---|---|---|
| 2,452,219 | A * | 10/1948 | Bergvall et al. | 285/322 |
| 2,702,716 | A * | 2/1955 | Basolo et al. | 285/322 |
| 3,051,514 | A * | 8/1962 | Consolloy | 285/323 |
| 3,711,126 | A * | 1/1973 | Hara et al. | 285/369 |
| 4,005,883 | A * | 2/1977 | Guest | 285/322 |
| 4,013,309 | A | 3/1977 | Quick | |
| 4,035,002 | A | 7/1977 | Curtin | |
| 4,299,413 | A | 11/1981 | Neher | |
| 4,632,435 | A * | 12/1986 | Polyak | 285/331 |
| 4,635,972 | A | 1/1987 | Lyall | |
| 4,969,668 | A | 11/1990 | Sauer | |
| 5,046,763 | A * | 9/1991 | Martucci et al. | 285/322 |
| 5,240,289 | A * | 8/1993 | Gottling et al. | 285/322 |
| 5,722,702 | A * | 3/1998 | Washburn | 285/322 |
| 6,494,493 | B1 | 12/2002 | Baruh | |
| 6,676,166 | B1 | 1/2004 | Wraith et al. | |
| 7,100,950 | B2 * | 9/2006 | Martin | 285/322 |
| 7,980,600 | B2 * | 7/2011 | Hofmann | 285/323 |
| 2008/0309067 | A1 | 12/2008 | Fazakerly | |
| 2011/0101671 | A1 | 5/2011 | Dixon | |

\* cited by examiner

*Primary Examiner* — David E Bochna
(74) *Attorney, Agent, or Firm* — Richard C. Litman

(57) ABSTRACT

The pipe repair coupling includes a sleeve and two seal retainers that clip to the ends of the sleeve to retain corresponding seals therein. The repair coupling is installed about a damaged section of PVC or other hard plastic pipe without the need for substantial displacement of either portion of the broken pipe or the need to dress or otherwise modify the broken ends of the pipe. A seal retainer and a seal are placed over each portion of the broken pipe, and the sleeve is slipped over one of the broken pipe portions. The two pipe portions are aligned with one another, and the sleeve is generally centered over the break. The two seal retainers are then snapped into place on the ends of the sleeve, capturing the seals between the seal retainers and corresponding seats and distending the seals to bear against the broken pipe therein.

15 Claims, 4 Drawing Sheets

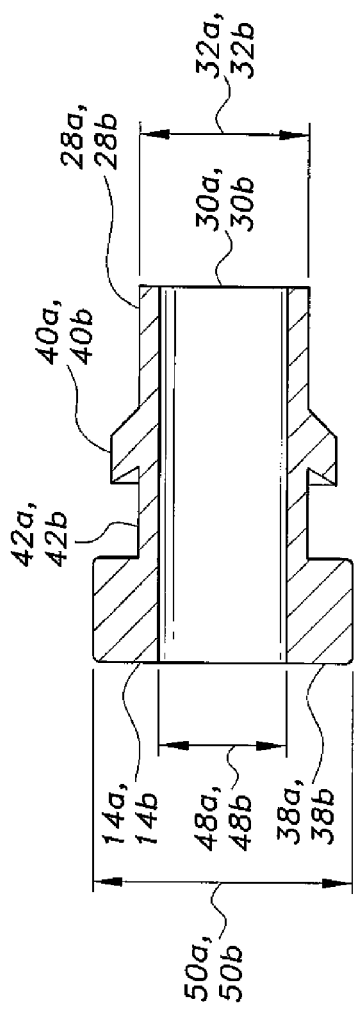
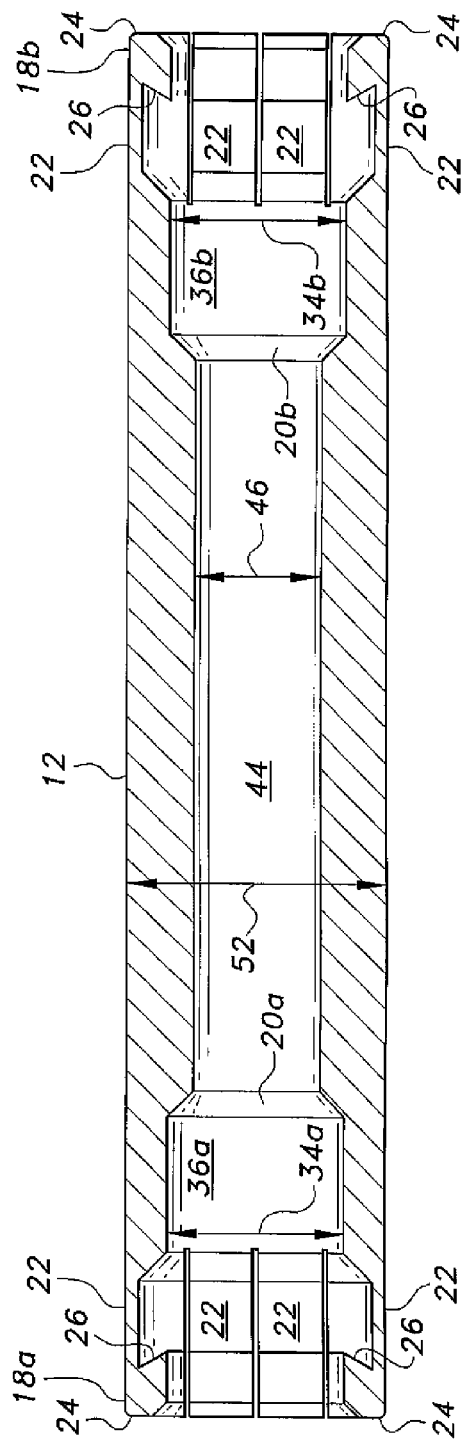

PIPE REPAIR COUPLING

BACKGROUND OF THE INVENTION

1. Field of the Invention

The present invention relates generally to plumbing pipes, tubes, and fluid conveyance systems, and particularly to a pipe repair coupling for the effective repair of polyvinyl chloride (PVC) and similar plastic pipes.

2. Description of the Related Art

Plastic pipe, and particularly polyvinyl chloride (PVC) plastic, has become increasingly popular for installation in household, commercial, and other water supply lines. While such plastic material has its limitations insofar as high temperatures are concerned, it has many advantages over metal pipe and tubing for use as water supply and drain pipe, such as economy, ease of installation, resistance to corrosion, and lack of toxicity.

Nevertheless, such PVC pipe is still subject to damage under certain conditions. Freezing temperatures that allow water within the pipe to freeze and expand may cause the pipe to split. Buried pipe may be damaged by excavation for construction, tree roots, and/or other causes. Obviously, when such damage occurs, it must be repaired.

Accordingly, a number of plastic pipe repair devices and systems have been developed in the past. Many, if not most, such repair devices and systems require that at least one end of the broken pipe be displaced laterally from its alignment with the pipeline. Plastic pipe is reasonably flexible and may accommodate a certain amount of bending to allow for the installation of the repair components. However, the use of many such repair components requires that a considerable amount of material be removed along the length of a buried pipe in order to allow sufficient movement of the pipe for the installation of the repair components without damaging the pipe further. This clearly adds to the difficulty of the repair, particularly if the pipe is encased in concrete or other extremely hard material. Other repair systems require that the ends of the pipe be dressed, grooved, or treated in some manner, which is extremely difficult to perform in a buried pipeline installation.

Thus, a pipe repair coupling solving the aforementioned problems is desired.

SUMMARY OF THE INVENTION

The pipe repair coupling is an assembly comprising a central coupling body or sleeve and first and second seal retainers that are clipped to the ends of the central sleeve to retain corresponding seals therein. The repair coupling may be installed about a damaged section of PVC or other hard plastic pipe without the need for substantial displacement of either portion of the broken pipe or the need to dress or otherwise modify the broken ends of the pipe.

The coupling body or sleeve has a smooth, continuous central bore that is unbroken by any stops or other discontinuities therein. The broken pipe is installed through the bore of the sleeve. Each end of the sleeve has a larger internal diameter than the central bore to accommodate a seal and the tubular extension of a seal retainer installed thereon. An additional expansion of the internal diameter is provided in each end of the sleeve to accept a circumferential barbed flange formed about the tubular extension of the seal retainer. Each end of the sleeve is provided with a plurality of axial slits defining a corresponding series of axial fingers, which flex radially outward to allow insertion of the barbed flange of the seal retainer therein. Each of the fingers terminates in an internally oriented prong. The prongs engage a circumferential groove about the seal retainer and grip the back of the barbed flange to lock the seal retainer to the sleeve.

An O-ring or other suitable resilient elastomer seal is captured between the end of the extension of each seal retainer and the face of the smaller diameter central bore of the sleeve. When the pipe is pressurized with water or other fluid, the fluid pressure is transmitted through the broken section of pipe between the pipe and the surrounding sleeve to bear against the inner face of the seal. This forces the seal outward against the end of the extension of the seal retainer, and distends the seal to force it both inward against the pipe and outward against the inner surface of the sleeve to provide a positive seal.

The present pipe repair coupling is quickly and easily installed. No tools or equipment are required once the damaged section of pipe is accessed. It may be necessary to completely separate the pipe at the break if the pipe still forms a continuous length. This may be done with any suitable tool, e.g., breaking the pipe with a shovel blade, etc., as the condition of the broken ends of the pipe is acceptable so long as the ends fit within the sleeve. One of the seal retainers and a seal are then placed over each portion of the pipe, i.e., to each side of the break, and the sleeve is placed over one of the portions of the pipe. The two sections of pipe are aligned with one another and the sleeve is slid back over the break in the pipe, positioning the break at approximately the midpoint of the sleeve. The two seal retainers are then snapped into place on the ends of the sleeve, with the prongs of the sleeve engaging the grooves of the seal retainers and gripping the backs of the barbed flanges of the retainers. This forces the seals into position between the ends of the tubular extensions of the seal retainers and the face of the smaller diameter central bore of the sleeve to complete the pipe repair.

These and other features of the present invention will become readily apparent upon further review of the following specification and drawings.

BRIEF DESCRIPTION OF THE DRAWINGS

FIG. 3 is an elevation view in section of one of the seal retainer components of the pipe repair coupling according to the present invention, illustrating various details thereof.

FIG. 4 is an elevation view in section of the coupling body of the pipe repair coupling according to the present invention, illustrating various details thereof.

Similar reference characters denote corresponding features consistently throughout the attached drawings.

DETAILED DESCRIPTION OF THE PREFERRED EMBODIMENTS

Figure 1:
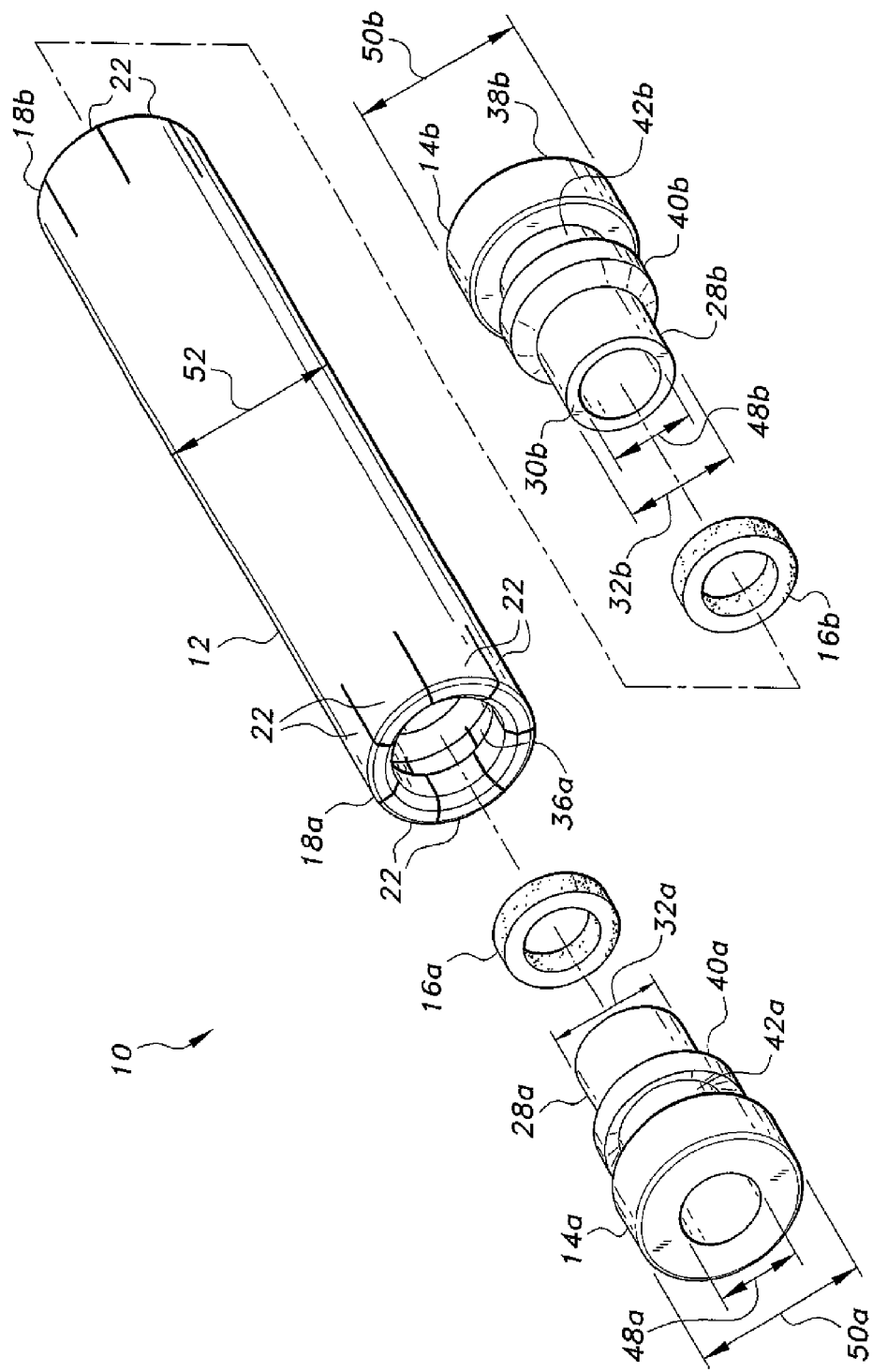
FIG. 1 is an exploded perspective view of a pipe repair coupling according to the present invention, illustrating its components.
Figure 2:
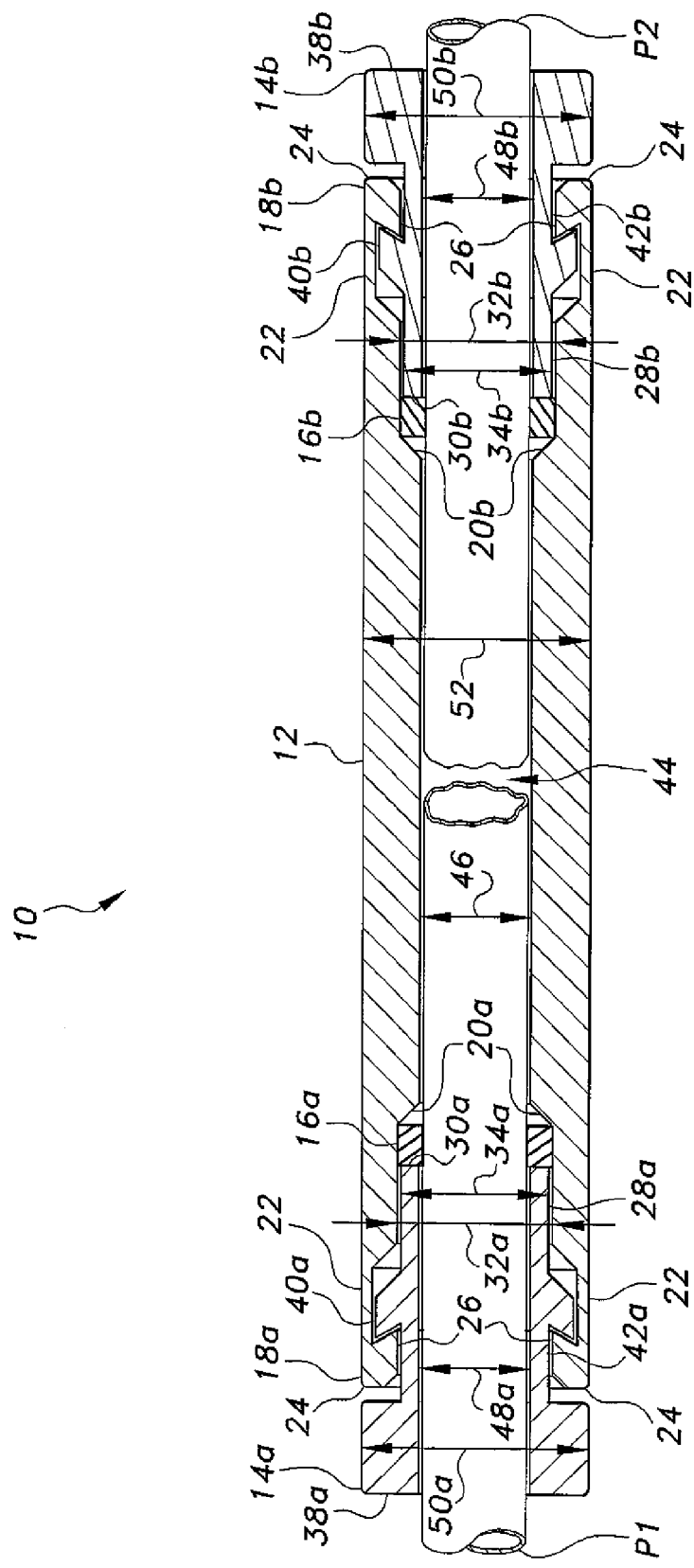
FIG. 2 is an environmental elevation view in section of the pipe repair coupling according to the present invention, showing the pipe repair coupling assembled along a broken pipe.
Figure 5:
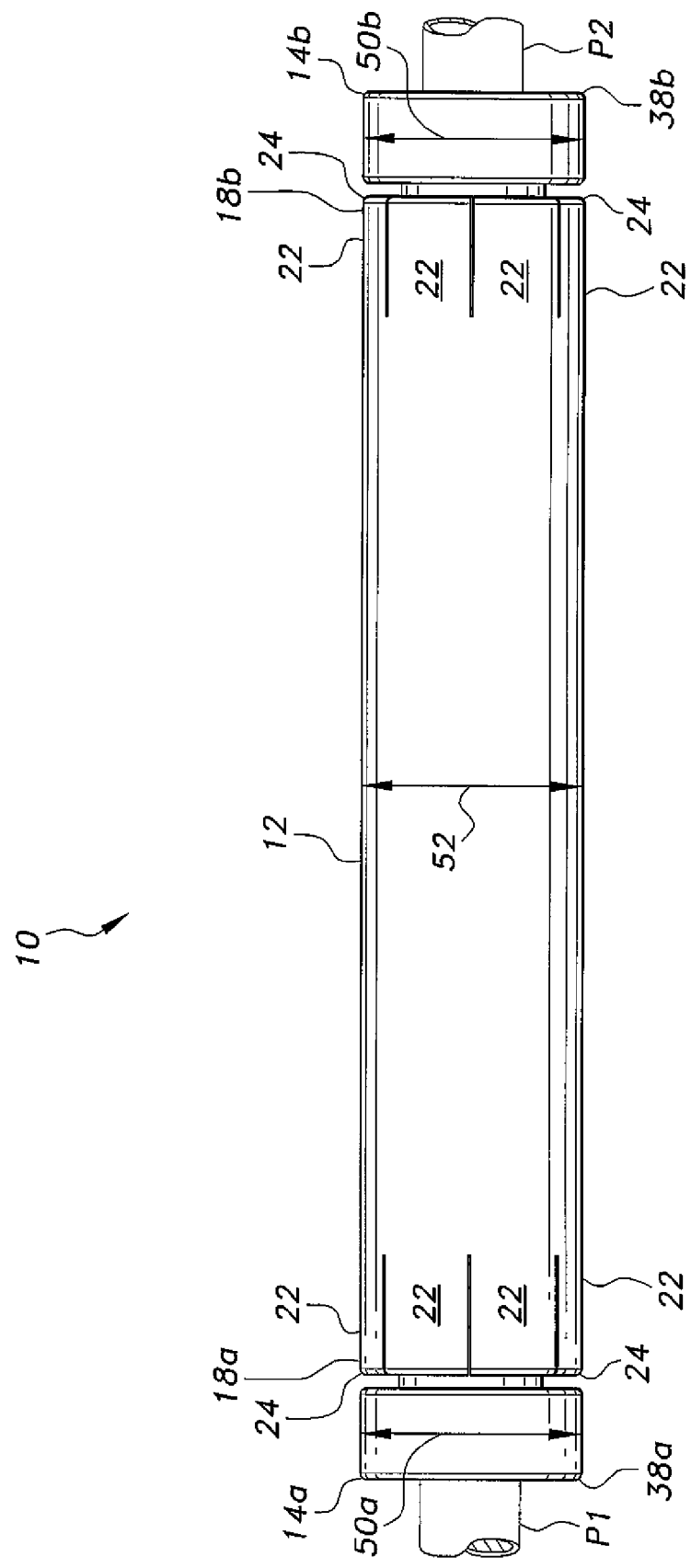
FIG. 5 is an environmental elevation view of the pipe repair coupling according to the present invention, showing the completed pipe repair coupling assembly installed upon a broken pipe.

The pipe repair coupling provides for the repair of broken or damaged PVC or other hard plastic pipe without the need for assembly tools, pipe cement, or other ancillary tools and/or equipment. FIG. 1 of the drawings provides an exploded perspective view of the components of the pipe repair coupling 10, FIG. 2 provides a view in section of the coupling 10 connecting two broken pipe sections P1 and P2 to one another, and FIG. 5 providing an external view of the installed coupling 10 on the pipe sections P1 and P2. The coupling 10 includes five basic components: (1) a cylindrical sleeve 12; (2) and (3) first and second seal retainers 14a and 14b; and (4) and (5) first and second seals 16a and 16b that are secured in the opposite ends of the sleeve 12 by the seal retainers 14a and 14b.

FIGS. 2 and 4 provide views in section showing the internal configuration of the sleeve 12. The sleeve 12 is laterally and axially symmetrical, having mutually opposed first and second ends 18a and 18b. An annular seal seat, respectively 20a and 20b, is disposed within each of the sleeve ends 18a and 18b. Each of the seal seats 20a, 20b has a frustoconical section, as can be seen by the tapering shape of the seats in the two sectional views of FIGS. 2 and 4.

Each of the sleeve ends 18a, 18b includes a plurality of axially oriented slots defined therein, dividing the ends into a corresponding plurality of axially disposed fingers 22, best seen in FIG. 1. As the sleeve 12 (and the two seal retainers 14a, 14b, as well) are preferably formed of a reasonably hard but ductile material, such as PVC plastic or the like, the fingers 22 may be flexed radially outward to allow the insertion of the seal retainers 14a and 14b therein, as described further below. Each of the fingers 22 has a distal end 24 and a prong 26 extending radially inward from the distal end 24 of each finger 22. The portions of the fingers 22 immediately inward from the prongs 26 are relatively thin, defining a relatively large internal diameter for accepting the medial portion of each of the seal retainers 14a and 14b. The plurality of prongs 26 of the circumferentially disposed fingers 22 at each of the sleeve ends 18a and 18b collectively form an acute angle between the faces of the prongs and the internal surface of the internal diameter of the fingers 22. This acute angle of the prong faces results in the prongs 26 locking the seal retainers 14a and 14b into the ends 18a, 18b of the sleeve 12 when assembled therewith, as described further below.

The seal retainers 14a, 14b are shown installed in the sleeve ends 18a, 18b in FIG. 2, and as a separate component in FIG. 3. It will be understood that the two seal retainers 14a, 14b are identical to one another. The seal retainer depicted in FIG. 3 may represent the second seal retainer 14b by inverting the image or reversing the image to form a mirror image. Each of the seal retainers 14a, 14b has a tubular extension, respectively 28a and 28b, and a seal retaining end 30a, 30b facing the corresponding seal seat 20a, 20b of the sleeve 12 when the seal retainers 14a, 14b are installed therein. Each of the tubular extensions 28a, 28b has an external diameter 32a, 32b. The internal diameter 34a, 34b of each of the seal retainer receptacles 36a, 36b is substantially the same and fits closely about the respective tubular extensions 28a, 28b of the seal retainers 14a, 14b.

Each of the seal retainers 14a, 14b has an outer end 38a, 38b and a circumferential flange 40a, 40b extending outwardly therefrom. Each of the flanges 40a, 40b is disposed generally medially about its respective seal retainer. The flanges 40a, 40b and outer ends 38a, 38b define respective circumferential grooves 42a, 42b therebetween. The circumferential flanges 40a and 40b form acute angles between their faces and the bottoms of the grooves 42a and 42b, i.e., the outer surfaces of the tubular extensions 28a, 28b of the seal retainers 14a, 14b. The faces of these acute angles mate against the corresponding faces of the prongs 26 of the sleeve fingers 22, thereby locking the prongs 26 of the sleeve fingers 22 into the respective grooves 42a, 42b of the seal retainers 14a, 14b to retain the seal retainers in the ends 18a and 18b of the sleeve 12 when assembled with one another.

The sleeve 12 has a smooth, continuous concentric bore or pipe passage 44 formed axially therethrough as shown most clearly in FIG. 4. The pipe repair coupling 10, and particularly the internal diameter 46 of the bore 44, is capable of being adapted to different pipe diameters. The bore 44 is devoid of any pipe stops or other discontinuities therein, permitting a length of pipe P1 or P2 to be passed completely through the sleeve 12. The tubular extensions 28a and 28b of the seal retainers 14a and 14b have internal diameters 48a and 48b substantially identical to the internal diameter 46 of the sleeve 12. The larger internal diameters 34a, 34b of the seal retainer receptacles 36a, 36b of the sleeve form the annular seal seats 20a and 20b with the smaller internal diameter 46 of the bore 44 of the sleeve 12.

The toroidal seals or gaskets 16a and 16b, e.g., resilient elastomer O-rings or the like, are installed within the respective seal retainer receptacles 36a and 36b of the sleeve 12. The material of which the two seals 16a, 16b are formed is preferably an NSF-approved elastomer suitable for use with pipes carrying potable water, although other materials may be used, where suitable. The seals 16a and 16b preferably have rectangular cross-sections, as shown in FIG. 1, and particularly in the cross-sectional view of FIG. 2. As the tubular extensions 28a and 28b of the two seal retainers 14a and 14b are inserted into their respective retainer receptacles 36a and 36b of the sleeve 12, the seals or gaskets 16a and 16b are compressed between the frustoconical seal seats 20a and 20b of the sleeve 12 and the seal retaining ends 30a and 30b of the tubular extensions 28a and 28b of the seal retainers 14a and 14b. As the seals 16a, 16b are compressed further, the frustoconical slopes of the two seal seats 20a, 20b force the seals to flow inward to press against the outer walls of the two pipe sections P1 and P2, thereby forming a leakproof seal against the pipe sections. The leakproof seal is retained by the locking of the flanges 40a and 40b of the seal retainers 14a and 14b by the prongs 26 of the fingers 22 extending from the ends of the sleeve 12. The resilient fingers 22 flex back into position as the prongs 26 pass over the flanges 40a and 40b of the seal retainers 14a and 14b so that the prongs 26 drop into the grooves 42a and 42b of the respective seal retainers 14a and 14b, thereby locking the seal retainers in place in the two ends 18a and 18b of the sleeve 12.

It will be noted that the external diameters 50a and 50b of the outer ends 38a and 38b of the two seal retainers 14a and 14b are substantially equal to the external diameter 52 of the sleeve 12. The sleeve 12 is constructed to have a minimum external diameter 52 based upon the required thicknesses of the fingers 22 inboard of their prongs 26. This sleeve diameter 52 is preferably uniform throughout the entire length of the sleeve 12. The uniform diameter 52 of the sleeve 12 and the substantially equal diameters 50a and 50b of the two seal retainers 14a and 14b provide a smooth external surface for the pipe repair coupling assembly 10 to preclude or at least greatly reduce the chances of the device catching upon some external object during installation.

Accordingly, the pipe repair coupling 10 provides a much easier means of repairing a broken PVC or other similar plastic pipe. The pipe repair coupling 10 does not require any tools or equipment for installation, as the two seal retainers 14a and 14b merely clip or snap into place in the respective ends 18a and 18b of the sleeve 12. Further, the pipe components or sections P1 and P2 do not require further work in preparation for installing the coupling 10, other than completely separating the two sections at the break point as necessary so that the sleeve 12, the two seal retainers 14a and 14b, and their seals 1a and 16b may be slipped over the pipe sections. The relatively small diameter of the repair coupling 10, i.e., on the order of twice the diameter of the pipe sections P1 and P2, requires minimal lateral displacement of either of the pipe sections for installation of the coupling, thereby further reducing the time and effort required for installation. The result will be much appreciated by anyone who has occasion to repair a broken plastic pipe.

It is to be understood that the present invention is not limited to the embodiments described above, but encompasses any and all embodiments within the scope of the following claims.

We claim:

1. A pipe repair coupling, comprising:
   a cylindrical sleeve having mutually opposed first and second ends, the first and second ends having an annular seal seat defined therein;
   a plurality of axially disposed, flexible fingers extending from each of the ends of the sleeve, each of the fingers having a distal end and a prong extending radially inward from the distal end;
   first and second seal retainers, each of the seal retainers having a tubular extension defining a seal retaining end and a circumferential flange and groove defined therein about the tubular extension, wherein the circumferential flange of each of the seal retainers has an outwardly facing surface, the surface forming an acute angle with the tubular extension of the seal retainer, the prongs of the sleeve engaging the grooves of the seal retainers to secure the seal retainers to the sleeve; and
   a toroidal seal captured between the seal retaining end of each of the seal retainers and the corresponding seal seat of the sleeve.

2. The pipe repair coupling according to claim 1, wherein:
   the sleeve has an external diameter and defines a smooth, continuous concentric bore, the bore having a diameter, each of the ends of the sleeve having a concentric seal retainer receptacle defined therein, the receptacles having larger diameters than the bore, the bore and the seal retainer receptacles defining the annular seal seats; and
   the tubular extensions of the seal retainers have external diameters substantially equal to the diameters of the receptacles of the sleeve, internal diameters substantially equal to the diameter of the bore of the sleeve, the circumferential groove of each of the seal retainers being disposed between the flange and the outer end of the seal retainer.

3. The pipe repair coupling according to claim 1, wherein:
   the sleeve has an external diameter; and
   each of the seal retainers has an outer end, the outer end having an external diameter substantially equal to the external diameter of the sleeve.

4. The pipe repair coupling according to claim 1, wherein the annular seal seats are frustoconical.

5. The pipe repair coupling according to claim 1, wherein the prongs collectively define an inwardly facing surface, the surface forming an acute angle with the fingers of the sleeve.

6. The pipe repair coupling according to claim 1, wherein each of the toroidal seals has a substantially rectangular cross section.

7. A pipe repair coupling, comprising:
   a cylindrical sleeve having an external diameter, mutually opposed first and second ends, and a smooth, continuous concentric bore defined therein, the bore having a diameter, each of the ends of the sleeve defining a concentric seal retainer receptacle therein, the receptacles having larger diameters than the bore, the bore and the seal retainer receptacles defining annular seal seats;
   first and second seal retainers, each of the seal retainers having a tubular extension defining a seal-retaining end, the tubular extensions having external diameters substantially equal to the diameters of the receptacles of the sleeve and internal diameters substantially equal to the diameter of the bore of the sleeve, wherein the tubular extension of each of the seal retainers has a circumferential flange disposed therearound, the circumferential flange having an outwardly facing surface forming an acute angle with the tubular extension of the seal retainer; and
   a toroidal seal captured between the seal retaining end of each of the seal retainers and the corresponding seal seat of the sleeve.

8. The pipe repair coupling according to claim 7, further comprising a plurality of axially disposed, flexible fingers extending from each of the ends of the sleeve, each of the fingers having a distal end and a prong extending radially inward from the distal end, each of the seal retainers having a circumferential groove disposed about the tubular extension, the prongs of the sleeve engaging the grooves of the seal retainers to secure the seal retainers to the sleeve.

9. The pipe repair coupling according to claim 8, wherein the prongs collectively define an inwardly facing surface, the surface forming an acute angle with the fingers of the sleeve.

10. The pipe repair coupling according to claim 7, wherein each of the seal retainers has an outer end, the outer end having an external diameter substantially equal to the external diameter of the sleeve.

11. The pipe repair coupling according to claim 7, wherein the annular seal seats are frustoconical.

12. The pipe repair coupling according to claim 7, wherein each of the toroidal seals has a substantially rectangular cross section.

13. A pipe repair coupling, comprising:
   a cylindrical sleeve having mutually opposed first and second ends and an external diameter, the first and second ends defining an annular seal seat therein;
   a plurality of axially disposed, flexible fingers extending from each of the ends of the sleeve, each of the fingers having a distal end and a prong extending radially inward from the distal end, the prongs collectively define an inwardly facing surface, the surface forming an acute angle with the fingers of the sleeve;
   first and second seal retainers, each of the seal retainers having a tubular extension defining a seal-retaining end and a circumferential flange and groove disposed about the tubular extension, each of the retainers having an outer end, the outer end having an external diameter substantially equal to the external diameter of the sleeve, the prongs of the sleeve engaging the grooves of the seal retainers to secure the seal retainers to the sleeve, the circumferential groove of each of the seal retainers being disposed between the flange and the outer end of the seal retainer, wherein the circumferential flange of each of the seal retainers has an outwardly facing surface, the surface forming an acute angle with the tubular extension of the seal retainer; and
   a toroidal seal captured between the seal retaining end of each of the seal retainers and the corresponding seal seat of the sleeve.

14. The pipe repair coupling according to claim 13, wherein the annular seal seats are frustoconical.

15. The pipe repair coupling according to claim 13, wherein each of the toroidal seals has a substantially rectangular cross section.

* * * * *